Patented Feb. 2, 1937

2,069,662

UNITED STATES PATENT OFFICE 2,069,662

PRODUCTION OF 2.3-DIHYDROINDOLES

Max Treppenhauer, Mannheim, Germany, assignor to General Aniline Works, Inc., New York, N. Y., a corporation of Delaware No Drawing. Application June 29, 1935, Serial No. 29,104. In Germany July 7, 1934

4 Claims. (Cl. 260—47)

The present invention relates to the production of 2.3-dihydroindoles.

It has already been proposed to prepare 2.3-dihydroindole and its homologues by adding hydrogen on to indole and its homolgues by means of tin and hydrochloric acid. Indole has also already been hydrogenated to form 2.3-dihydroindole electrolytically.

Attempts to add free hydrogen onto indole while employing catalysts have not, however, led to the desired result. When using noble metal catalysts, only completely hydrogenated products, such as octohydroindole, have been obtained. By hydrogenation with nickel in the gaseous phase, orthotoluidine and methane are formed from indole. Also by treating indole and its homologues in the liquid phase with nickel and hydrogen under pressure there are formed in addition to orthoalkylanilines, only products which are hydrogenated only in the benzene nucleus or completely. Only in the case of pure indole can 2.3-dihydroindole be obtained and then only in very bad yields; homologues of indole and commercial indole cannot be hydrogenated without splitting the pyrrol ring.

I have now found that 2.3-dihydroindoles, under which expression I understand 2.3-dihydroindole and its homologues and substitution products, can be obtained in very good yields by hydrogenating the corresponding indoles at elevated temperature between 100° and 300° C. in the presence of catalysts consisting of or containing copper or compounds of copper, especially those compounds which are reducible under the working conditions, which catalysts are hereinafter collectively referred to as catalysts comprising copper.

The process may be carried out in the gaseous phase at atmospheric or increased pressure, but it is especially advantageous to carry it out in the liquid phase under increased pressure, for example above 20 atmospheres, preferably above 50 atmospheres. In some cases it is preferable to carry out the hydrogenation in the presence of solvents or diluents, as for example liquid hydrocarbons, such as hexahydrobenzene or tetrahydronaphthalene, or alcohols, such as ethyl- or butyl-alcohol or cyclohexanol, or ethers. When working in the liquid phase, the process may be rendered continuous either by allowing the product to be hydrogenated to flow over rigidly arranged catalysts or by allowing it to trickle in admixture with finely divided catalysts over filler bodies.

Instead of pure hydrogen, gases containing hydrogen or agents supplying hydrogen under the working conditions may be employed for the hydrogenation. The hydrogen pressure may be increased to 200 atmospheres and more without the benzene ring being hydrogenated. The most favorable reaction temperatures lie between 150° and 250° C.

In addition to indole and its homologues, such as methylindole, ethylindole, phenylindole, cyclohexylindole or tetramethyleneindole, substitution products of indole and its homolgues may also be employed and hydrogenated in the 2.3-positions in the same manner, as for example amino, chloro, alkoxy or carboxy compounds.

As catalysts, finely divided copper obtainable by the careful reduction of copper compounds, such as copper oxide or copper carbonate, may be employed. It is usually preferable to employ activated copper catalysts (for example copper catalysts activated by the addition of small amounts of promoting substances) or mixed catalysts containing copper, which may also contain carrier substances, such as active carbon, bleaching earths, kieselguhr and the like. These may be prepared by known methods and pretreated for example by heating in vacuo, in air, nitrogen or steam. It is not always necessary, especially when working in the liquid phase, to reduce the catalyst before its employment. By employing copper compounds, such as the formate, which leave behind finely divided copper when heated, the preparation of the catalyst in a special operation may be avoided.

Suitable catalysts are obtained for example as follows: an active mixture of copper and magnesium oxide is obtained by the decomposition of a copper-magnesium alloy with steam. A catalyst consisting of basic copper carbonate and aluminium hydroxide is obtainable by precipitating a common solution of the nitrates by means of sodium bi-carbonate solution. An active copper chromite catalyst is obtainable by heating copper chromate. An active finely divided copper is obtained on silica gel by impregnating the gel with a solution of copper nitrate, heating and careful reduction with hydrogen. Furthermore, copper zeolite, which is very active, is obtained by causing artificial alkali zeolite (known in commerce as "Permutit") to react with a solution of copper nitrate.

The catalysts may contain in addition to copper, one or more other metals of the 1st to the 7th groups of the periodic system, such as sodium, calcium, zinc, vanadium, molybdenum, tungsten and manganese or their compounds. Catalysts are also suitable which contain in addition to copper elements of the 8th group of the periodic system, for example, cobalt or nickel. It is usually preferable, however, for these elements to be present only in small amounts so that the specific catalytic action of the copper is not impaired.

The following examples will further illustrate the nature of this invention but the invention is not restricted to these examples. The parts are by weight.

Example 1

100 parts of commercial 2-methylindole are heated in a stirring autoclave under a hydrogen pressure of 200 atmospheres to 220° C. with 4 parts of copper oxide (obtained by heating commercial copper carbonate at 400° C.) until the absorption of hydrogen has ceased. The reaction product separated from the catalyst is subjected to fractional distillation in vacuo. Besides unchanged 2-methylindole, 2.3-dihydro-2-methylindole having a boiling point of from 115° to 117° C. at a pressure of 18 millimeters (mercury gauged) is obtained in a yield of more than 90 per cent of the converted 2-methylindole.

Example 2

1 molecular proportion of copper nitrate, 0.1 molecular proportion of aluminium nitrate and 0.005 molecular proportion of barium nitrate are dissolved together and then precipitated by the addition of sodium bicarbonate solution. The precipitate is filtered off, washed, dried and carefully reduced at from 180° to 200° C. in a mixture of hydrogen and nitrogen. The resulting catalyst is a black-brown powder after cooling.

If 100 parts of 2-methylindole be heated at 180° C. with 3 parts of the said catalyst under the conditions specified in Example 1, 2.3-dihydro-2-methylindole is obtained in a yield of more than 95 per cent of the converted 2-methylindole.

Example 3

A solution containing copper nitrate and manganese nitrate in equimolecular proportions is precipitated with sodium bicarbonate solution, the precipitate is washed, dried and heated at from 400° to 450° C.

100 parts of 2-methylindole together with 3 parts of the resulting catalyst are treated in the manner described in Example 2. The 2-methylindole is converted to the extent of about 80 per cent and 2.3-dihydro-2-methylindole is obtained in a yield of more than 95 per cent of the converted 2-methylindole.

Example 4

Indole is treated in the manner described in Example 2 under a hydrogen pressure of 200 atmospheres at 170° C. until the absorption of hydrogen has ceased. 90 per cent of the initial indole are thus converted. From the converted product 2.3-dihydroindole having a boiling point of from 112° to 113° C. at a pressure of 17 millimeters (mercury gauge) is obtained in an almost quantitative yield.

Example 5

2.5-dimethylindole having a melting point of from 113° to 115° C. is treated in the manner described in Example 2 under a hydrogen pressure of 250 atmospheres at a temperature of 170° C. until the absorption of hydrogen has ceased. 85 per cent of the said 2.5-dimethylindole are thus converted. From the converted product 2.3-dihydro-2.5-dimethylindole having a boiling point of 126° C. at a pressure of 18 millimeters (mercury gauge) and a melting point of from 35° to 37° C. is obtained in an almost quantitative yield.

Example 6

1.2-dimethylindole is treated in the manner described in Example 2 at a temperature of 180° C. and under a hydrogen pressure of 200 atmospheres. 1.2-dimethyl-2.3-dihydroindole having a boiling point of from 94° to 95° C. at a pressure of 13 millimeters (mercury gauge) is obtained in a very good yield.

Example 7

2.6-dimethylindole boiling at 84° and having a melting point of from 151° to 153° C. at a pressure of 11 millimeters (mercury gauge) is hydrogenated in the manner described in Example 2. 2.6-dimethyl-2.3-dihydroindole having a boiling point of from 111° to 112° C. at a pressure of 10 millimeters (mercury gauge) is obtained in a very good yield.

Example 8

2-methyl-6-methoxyindole melting at from 101° to 102° C. is treated in the manner described in Example 2 at 180° C. under a hydrogen pressure of 200 atmospheres. 2-methyl-6-methoxy-2.3-dihydroindole having a boiling point of from 142° to 145° C. at 10 millimeters (mercury gauge) is obtained in a good yield.

What I claim is:—

1. A process for the production of 2.3-dihydroindoles which comprises subjecting an indole which is not hydrogenated in the nucleus containing the nitrogen atom to the action of hydrogen at an elevated temperature between 100° and 300° C. in the presence of a catalyst comprising essentially copper.

2. In the process as claimed in claim 1, operating in the liquid phase under a pressure above 20 atmospheres.

3. In the process as claimed in claim 1, operating at a temperature between 150° and 250° C.

4. In the process as claimed in claim 1, operating in the presence of a catalyst comprising essentially copper which has been pre-treated with hydrogen.

MAX TREPPENHAUER.